UNITED STATES PATENT OFFICE.

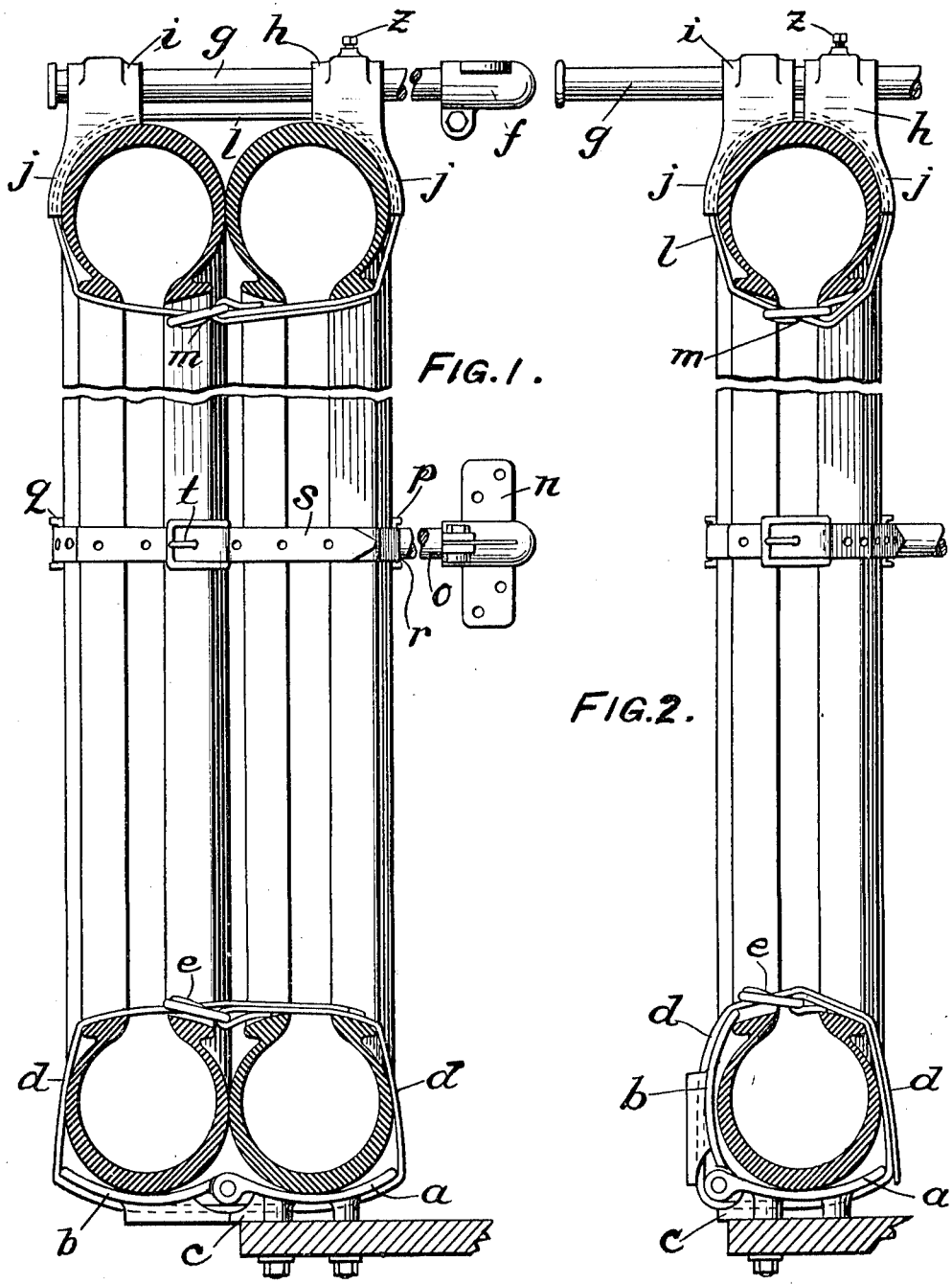

FRANK SELLERS GARRETT, OF WILMINGTON, DELAWARE, ASSIGNOR TO HIMSELF AND HENRY KEPPELE MILLER, OF WILMINGTON, DELAWARE, TRADING AS GARRETT, MILLER & CO.

TIRE-HOLDER.

1,001,632.     Specification of Letters Patent.     Patented Aug. 29, 1911.

Original application filed April 19, 1910, Serial No. 556,376. Divided and this application filed August 6, 1910. Serial No. 575,913.

*To all whom it may concern:*

Be it known that I, FRANK SELLERS GARRETT, a citizen of the United States, residing at Wilmington, county of Newcastle, and State of Delaware, have invented a new and useful Improvement in Tire-Holders, of which the following is a full, clear, and exact description, reference being had to the accompanying drawings, which form a part of this specification.

This application is a division of an application filed by me April 19th, 1910, Serial No. 556,376.

My invention relates to certain improvements in tire holders whereby the device is readily adapted for the support of a plurality of tires or a single tire, and further, the device is so arranged that the securing straps, together with the support and guide bracket, extend around the tires in a manner to better secure the tires in position.

Specifically speaking, I provide base supports for the tires, hinged together so that one may be folded upon the other when a single tire alone is carried. Further, with respect to the top and side guides, they consist of brackets which are adjustable with respect to each other so that they may be brought closer or farther from each other to accommodate either a single or a plurality of tires. The guiding or supporting surfaces of these brackets are made curved so as to adapt themselves to the curvature of the tire, and finally, are made tubular so that a single strap may be supported from the tubular portion and secured together around the tire.

Particularly my invention resides in the construction for introducing the straps, and the tubular support for the tire guides, the two section tire guides and the relative movement of these two portions or sections of the tire guides to adapt themselves to a single or plurality of tires.

I will now describe the embodiment of my invention illustrated in the accompanying drawings, in which—

Figure 1 is a section through my device showing two tires being carried. Fig. 2 is a view similar to Fig. 1, but only one tire being carried.

Upon the running board are placed the base tire guides or supports $a$ and $b$ which are curved and secured to the running board through the medium of the plate $c$. The two sections $a$ and $b$ are hinged together so that when a single tire is in use they may be folded up in the position shown in Fig. 2. A strap $d$ passes around these base guides $a$ and $b$ through an orifice in the plate $c$ and the free ends of the strap $d$ may be secured together, as shown at $e$.

One set of the top guides is secured to the car body by the bracket $f$, from which extends the rod $g$. Upon this rod $g$ is one section $h$ of the top guide which is locked or fixedly secured to the shaft by the set screw $z$. Loosely mounted, so as to be movable along said rod $g$ is the other section $i$ of the top tire guide. These tire guide sections each have the curved portions $j$ to adapt itself to the tire, and have the tube or orifice $k$ through which passes the strap $l$, and which strap extends around the tire and is secured at its free end $m$.

The side guides are secured in the following manner: The bracket $n$ of the side guides may be secured to the dash board (as shown) from which bracket projects the rod $o$, to which one member $p$ of the side guides is fixedly secured by set screw $w$ and the other member $q$ is loosely mounted upon the rod $o$ so as to move longitudinally of the rod. These sections $p$ and $q$ are curved in a manner similar to the top guide sections and have orifices or tubes $r$ through them similar to the orifices or tubes in the top guides, and through which orifices pass the strap $s$, the free ends of which strap may be secured together around the tire, as shown at $t$.

In Fig. 1 the arrangement is shown with two tires carried thereon and in Fig. 2 with one tire carried thereon. In the latter case, as may be seen, the movable sections of the top and side guides have been moved closer to the fixed sections than in the other figure, so that the strap passing through may readily be secured around the single tire. The base guide sections are swung together on the hinge connection so that they with the straps are also brought close together to conform to the single tire arrangement.

Having now fully described my invention, what I claim and desire to protect by Letters Patent is:

1. In a tire holder, a two-section guide, a rod upon which one section is loosely mounted, and means to fixedly secure the other section to the rod and a single strap passing through both guide sections and adapted to pass around the tire.

2. In a tire holder, in combination, a guide formed in two sections, a rod upon which said sections are mounted so as to have a longitudinal movement toward and from each other and a single strap passing through both guide sections and adapted to pass around the tire.

3. In a tire holder, in combination, two guides, each having a curved clamping section of the shape of the opposite sides of the tire, there being a curved orifice through each clamping section, and a single strap passing through both orifices for surrounding the tire.

4. In a tire holder, in combination, two guides, each having a curved clamping section, adapted to opposite sides of the tire, there being a curved orifice through each clamping section, the curvature of which orifice is concentric with the faces of the curved clamping surface, and a single strap passing through both orifices for surrounding the tire.

In testimony of which invention, I have hereunto set my hand, at Wilmington, on this third day of August, 1910.

FRANK SELLERS GARRETT.

Witnesses:
WILLIAM H. GIBBONS,
ALFRED B. MOORE.

---

Copies of this patent may be obtained for five cents each, by addressing the "Commissioner of Patents, Washington, D. C."